(12) United States Patent
Takayama

(10) Patent No.: US 7,830,871 B2
(45) Date of Patent: Nov. 9, 2010

(54) COMMUNICATION APPARATUS, COMMUNICATION METHOD AND COMMUNICATION PROGRAM

(75) Inventor: Hajime Takayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 484 days.

(21) Appl. No.: 11/505,937

(22) Filed: Aug. 18, 2006

(65) Prior Publication Data
US 2007/0047550 A1 Mar. 1, 2007

(30) Foreign Application Priority Data

Aug. 24, 2005 (JP) .............................. 2005-243421
Aug. 10, 2006 (JP) .............................. 2006-218427

(51) Int. Cl.
*H04L 12/28* (2006.01)
*H04L 12/56* (2006.01)

(52) U.S. Cl. ........................ 370/389; 370/392; 709/223

(58) Field of Classification Search ................. 370/252, 370/389, 392; 709/223, 224, 226, 245
See application file for complete search history.

(56) References Cited

U.S. PATENT DOCUMENTS

| 6,865,611 | B1 * | 3/2005 | Bragg | 709/238 |
| 7,292,539 | B2 * | 11/2007 | Ko et al. | 370/252 |
| 2003/0120766 | A1 * | 6/2003 | Ishiyama et al. | 709/223 |
| 2003/0182445 | A1 * | 9/2003 | Smith et al. | 709/238 |
| 2005/0041671 | A1 * | 2/2005 | Ikeda et al. | 370/395.52 |

FOREIGN PATENT DOCUMENTS

| JP | 2000-232460 | 8/2000 |
| JP | 2006-025389 | 1/2006 |

\* cited by examiner

*Primary Examiner*—Chirag G Shah
*Assistant Examiner*—Minh-Trang Nguyen
(74) *Attorney, Agent, or Firm*—Harness, Dickey & Pierce, P.L.C.

(57) ABSTRACT

For carrying out communication with the use of an IP address, prefix information is extracted from a router advertisement, the prefix information is registered and managed; and a predetermined number of prefixes are selected from the prefix information registered and the IP address is generated therefrom.

17 Claims, 18 Drawing Sheets

FIG.3

| prefix | prefix length | lifetime | router address | router lifetime |
|---|---|---|---|---|
| 2001:1000::31:0:0:0 | 64 | 7200 | fe80::800:2bb3:fd45 | 7200 |
| 2001:1015::8f3e:0:0:0 | 64 | 86400 | fe80::0203:93ff:fe0a:d446 | 86400 |
| 2001:1212:11:31:0:0:0 | 64 | 28800 | fe80::0201:02ff:fe8a:9006 | 28800 |
| 3ffe:23f5:0:0:0203:0:0:0 | 64 | 28800 | fe80::0201:02ff:fe8a:9006 | 28800 |
| 2001:3eff:0492:31:0:0:0 | 64 | 7200 | fe80::800:2bb3:fd45 | 7200 |
| 2001:1000:0:aaaa:31:0:0:0 | 64 | 7200 | fe80::800:2bb3:fd45 | 7200 |

FIG.16

Stateless addr.
2001:1212:11:32::/64

COMMUNICATION APPARATUS, COMMUNICATION METHOD AND COMMUNICATION PROGRAM

BACKGROUND OF THE INVENTION

1. Field of the Invention

The present invention relates to a communication apparatus, a communication method and a communication program for carrying out communication with the use of an IPv6 address.

2. The Description of the Related Art

They said that the problem concerning a depletion of IP addresses will be solved by means of application of IPv6. Accordingly, it is expected that many apparatuses will be connected to a communication network from now. Along therewith, a work amount required for network management may increase accordingly. A work amount will increase much if IP addresses are set one by one for respective ones of the very many communication apparatuses. In order to solve this problem, a scheme of automatic connection thanks to a so-called plug-and-play function is prevailing.

One of two methods, i.e., a state-full method for preparing IP addresses in an address pool and a stateless method (i.e., "stateless address autoconfiguration") for not requiring such an address pool, may be applied for such a plug-and-play function for setting the addresses. As the state-full method, a system using DHCP (Dynamic Host Configuration Protocol) is applied. On the other hand, in the stateless method, which is prescribed in a standard for IPv6, a router advertisement including network prefix information (i.e., network addresses and so forth) is issued for a segment of a network. Each network apparatus then automatically generates an IP address with the use of the network prefix thus obtained and the interface identifier of its own.

With the use of such a plug-and-play function, many apparatuses can be connected to a communication network without requiring an extra work load by a network manager. In particular, when the use of IPv6 prevails, it is expected that communication networks operating with the use of such stateless address autoconfiguration plug-and-play function increases, since the operation becomes easier.

Thus, in IPv6, an address generated by stateless address autoconfiguration can be automatically set based on network information submitted by a router.

SUMMARY OF THE INVENTION

However, for a case of a so-called incorporating apparatus (described later), a sufficient memory capacity may not be provided for effectively using addresses generated by the stateless address autoconfiguration based on router advertisements issued by a plurality of routes. Further, a so-called false router may issue false router advertisements which may uselessly consume the storage area prepared for address management.

The incorporating apparatus means electric/electronic apparatus which has a function for connecting to a communication network. For example, a MFP (Multi-Function Peripheral), a PDA, a digital camera, a so-called information appliance, a hard disk recorder and so forth, may be included in this category. The MFP has, within a single housing, a printer function, a facsimile function, a copier function and a scanner function. Generally speaking, these incorporating apparatuses should be miniaturized, reduced in their weights and reduced in the costs, and thus, a memory size prepared therein should be reduced as much as possible. In this term, the above-mentioned case, in which the required memory capacity may not be satisfactorily ensured, may occur in many cases.

The present invention has been devised in consideration of this situation, and an object of the present invention is to provide a communication apparatus, a communication method, and a communication program for using addresses generated by stateless address autoconfiguration in such a situation that an available memory capacity for address management is limited.

In order to achieve this object, according to a first aspect of the present invention, a communication apparatus carrying out communication with the use of an IP address, includes: a prefix information storing part in which prefix information included in a router advertisement is registered; a prefix information managing part extracting the prefix information from the router advertisement, registering the prefix information in the prefix information sorting part and managing the prefix information; an address selecting part selecting a predetermined number of prefixes from the prefix information registered in the prefix information storing part, and generating the IP address.

According to a second aspect of the present invention, in the first aspect of the present invention, the address selecting part thus may select the prefix information, in an order in which the prefix information was registered in the prefix information storing part.

According to a third aspect of the present invention, in the first or the second aspect of the present invention, the prefix information registered in the prefix information storing part may include prefix information meeting a predetermined requirement.

According to a fourth aspect of the present invention, in the third aspect of the present invention, the prefix information meeting the predetermined requirement may be prefix information not yet registered in the information storing part.

According to a fifth aspect of the present invention, in the third aspect of the present invention, the prefix information meeting the predetermined requirement may be prefix information included in the router advertisement issued by a default router.

According to a sixth aspect of the present invention, in the third aspect of the present invention, the predetermined requirement may be applied when the number of sets of prefix information registered in the prefix information storing part has reached a predetermined number.

According to a seventh aspect of the present invention, in any one of the first through sixth aspects of the present invention, the prefix information managing part may determine the prefix information, for which the number of times it has been applied in communication is relatively small, from among the prefix information selected by the prefix information selecting part, and may delete the thus-determined prefix information.

According to an eighth aspect of the present invention, in any one of the first through seventh aspects of the present invention, the communication apparatus may further have a submit information generating part generating submit information for submitting to a user the prefix information stored in the prefix information storing part; and a selection input analyzing part analyzing the contents selected and input by the user from among the thus-submitted prefix information, recognizing the prefix information thus selected by the user, and notifying the address selecting part of the thus-selected prefix information.

According to a ninth aspect of the present invention, in the eighth aspect of the present invention, the prefix information selected by the user may be stored in a nonvolatile storage part.

According to a tenth aspect of the present invention, in the eighth or the ninth aspect of the present invention, the submit information generated by the submit information generating part may be an address generated by stateless address autoconfiguration.

According to an eleventh aspect of the present invention, in any one of the eighth through tenth aspects of the present invention, the address selecting part may newly select the prefix information when validity due of the IP address generated from the selected prefix information has expired.

According to a twelfth aspect of the present invention, in any one of the eighth through eleventh aspects of the present invention, the submit information generating part may submit to the user that the currently used IP address has become not usable when a validity due of the IP address generated from the selected prefix information has expired.

According to a thirteenth aspect of the present invention, in any one of the eighth through twelfth aspects of the present invention, the address selecting part may select the IP address when the IP address has become usable again.

According to a fourteenth aspect of the present invention, a communication method for carrying out communication with the use of an IP address, has a prefix information managing step of extracting the prefix information from a router advertisement, registering the prefix information and managing the registered prefix information; and an address selecting step of selecting a predetermined number of prefixes from the prefix information registered in the prefix information storing part, and generating the IP addresses.

According to a fifteenth aspect of the present invention, in the fourteenth aspect of the present invention, the prefix information to be registered may be prefix information meeting a predetermined requirement; and the prefix information meeting the predetermined requirement may be prefix information included in the router advertisement issued by a default router.

According to a sixteenth aspect of the present invention, in the fourteenth or the fifteenth aspect of the present invention, in the prefix information managing step, prefix information may be determined, for which the number of times it has been applied in communication is relatively small, from among the prefix information selected in the prefix information selecting step, and the thus-determined prefix information may be deleted.

According to a seventeenth aspect of the present invention, in any one of the fourteenth through the sixteenth aspects of the present invention, the communication method may further has a submit information generating step of generating submit information for submitting to a user the prefix information registered in the prefix information managing step; and a selection input analyzing step of analyzing the contents selected and input by the user from among the submitted prefix information, recognizing the prefix information thus selected by the user, and providing the address selecting step of the thus-selected prefix information.

According to an eighteenth aspect of the present invention, in the seventeenth aspect of the present invention, in the address selecting step, the prefix information may be newly selected when a validity due of the IP address generated from the selected prefix information has expired.

According to a nineteenth aspect of the present invention, in the seventeenth or the eighteenth aspect of the present invention, in the address selecting step, the IP address may be selected when the IP address has become usable again.

According to a twentieth aspect of the present invention, a program for causing a computer to carry out a communication method for carrying out communication with the use of an IP address, has the instructions to cause the computer to carry out a prefix information managing step of extracting the prefix information from a router advertisement, registering the prefix information and managing the registered prefix information; and an address selecting step of selecting a predetermined number of prefixes from the prefix information registered in the prefix information storing part, and generating the IP address.

Thus, according to the present invention, in the communication apparatus, the communication method or the communication program for carrying out communication with generating an IP address with the use of an automatic address generating function in the stateless method (stateless address autoconfiguration) based on a router advertisement, and connecting to a communication network, prefix information to store can be thus effectively reduced by means of limiting the prefix information to actually use or such. Accordingly, the present invention is advantageous in that, by applying the above-described manner according to the present invention, the useful scheme can be applied in which the addresses to be used are generated by means of stateless address autoconfiguration, even in a situation such that an available memory capacity for address management is limited.

Other objects and further features of the present invention will become more apparent from the following detailed description when read in conjunction with the accompanying drawings:

BRIEF DESCRIPTION OF THE DRAWINGS

FIG. 3 shows a prefix information list;

FIG. 16 shows a page submitting only prefix information;

DETAILED DESCRIPTION OF THE PREFERRED EMBODIMENTS

Embodiments of the present invention will now be described with reference to figures. In the description below, an IP address may be simply referred to as an address.

First, a way as to how an address generated by stateless address autoconfiguration is generated in IPv6 is described. It is noted that the procedure described below is merely an abstract, and the details are written in RFC2462 (described below). According to the procedure described in RFC2462, the address is generated with the use of prefix information included in a router advertisement, which is returned in response to a router solicitation or is periodically transmitted.

For RFC2462 (prescribing communication standards), the latest updated information can be obtained from a URL: www.rfc-editor.org/(May 19, 2006), then, a linkage of 'RFC Database', and a linkage of 'RFC Index—Earliest first'.

Figure 1:
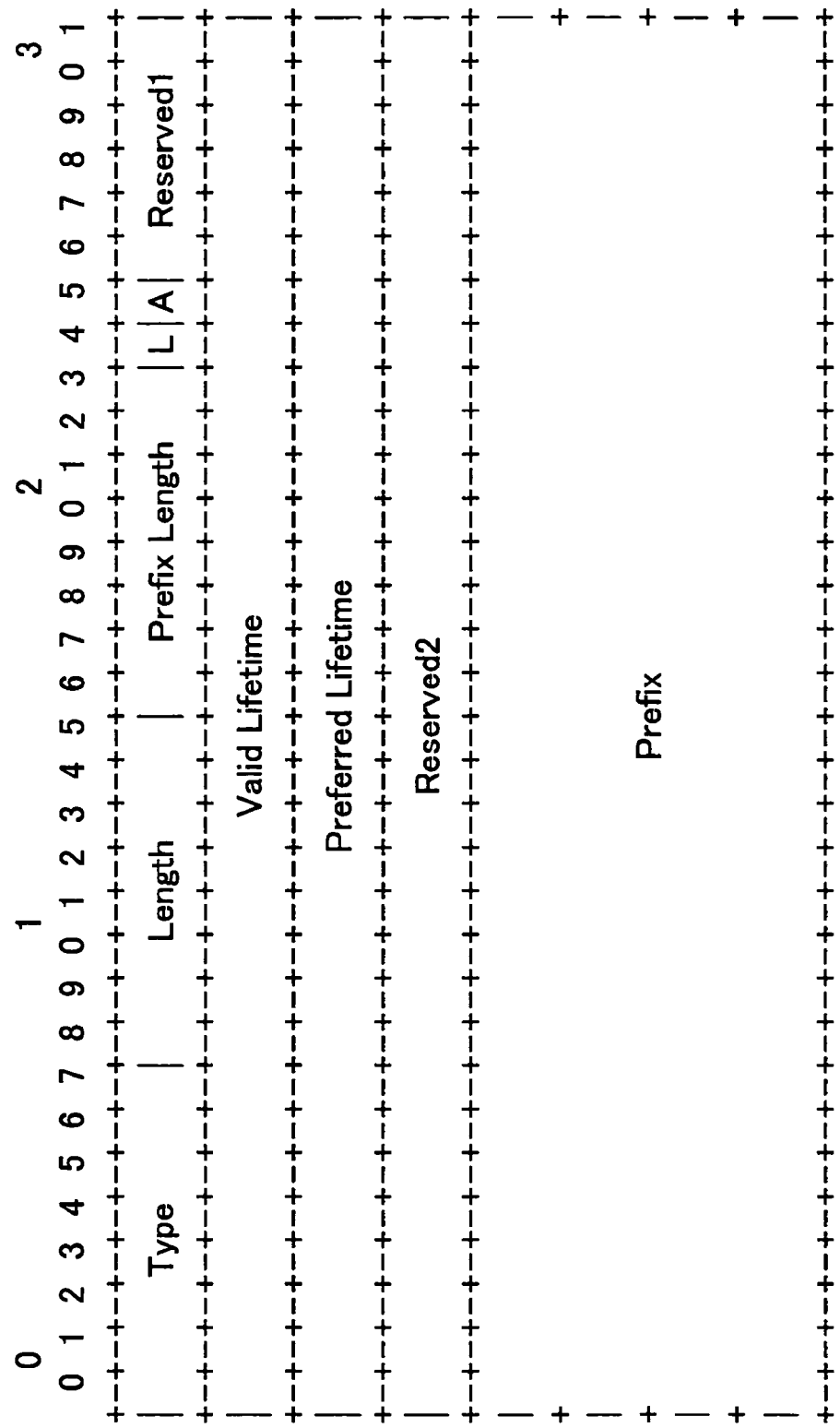
FIG. 1 shows prefix information.

FIG. 1 shows one example of prefix information. Prefix information has 'Valid Lifetime', 'Preferred Lifetime' and 'Prefix'. 'Valid Lifetime' shows a valid period for the address. 'Preferred Lifetime' shows a recommended valid period of the address. 'Prefix' shows the 'prefix' itself.

A communication apparatus which receives the router advertisement carries out the following operation. That is, when an autonomous address automatic setting flag is not set, the prefix is equal to a link local prefix, or the preferable lifetime is longer than the valid lifetime, the prefix information of the router advertisement is ignored.

Otherwise, the prefix included in the prefix information and an interface ID (interface identifier) of the communication apparatus itself are connected together, and thus, an address is generated. The thus-generated address is allocated for the interface, and is used during the valid lifetime based on the preferred lifetime included in the prefix information. The valid lifetime of the address is extended by the prefix information included in the router advertisement transmitted periodically.

Thus, the address is generated from the prefix information originally given by the router. When there are a plurality of routers, a plurality of addresses generated by stateless address autoconfiguration may be used for the network segment. When the addresses generated by stateless address autoconfiguration are actually used, a corresponding storage area in a memory is required for managing communication itself and managing the address's valid lifetime.

Therefore, when the addresses generated by stateless address autoconfiguration may be generated unlimitedly, a system resource such as a memory of the communication apparatus is consumed much accordingly, and, as a result, in the worst case, the communication apparatus may not carry out proper operation due to the lack of the system resource. In particular, for the above-mentioned so-called incorporating apparatus or such, this problem may become serious, and thus, it may be difficult to actually introduce IPv6, automatically generate addresses by stateless address autoconfiguration, and use them.

Figure 2:
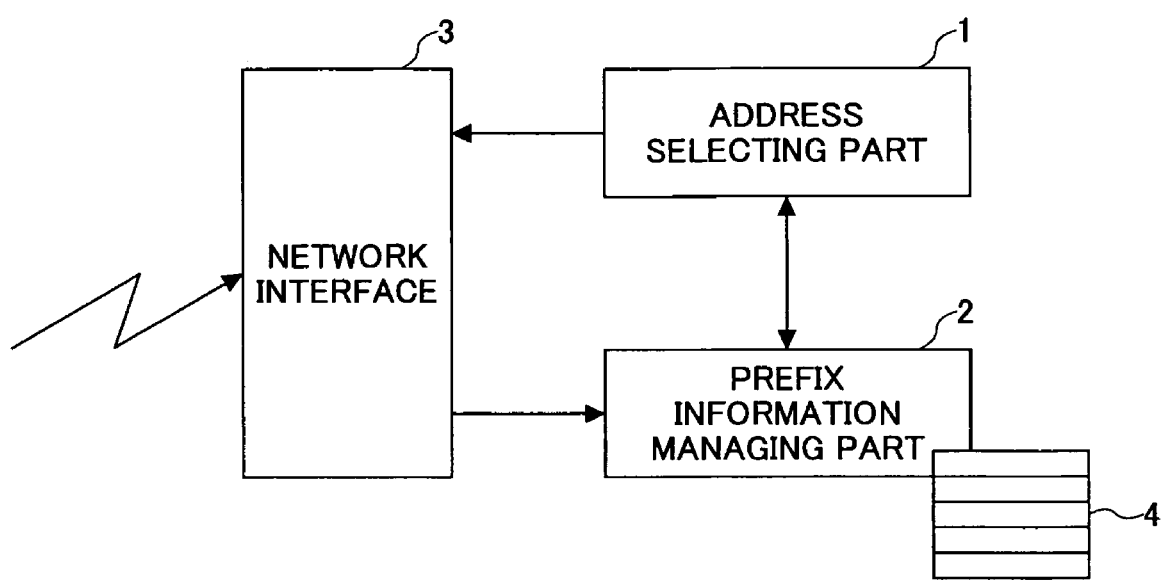
FIG. 2 shows a configuration of a communication apparatus in one embodiment of the present invention.

FIG. 2 shows a configuration of a communication apparatus according to an embodiment of the present invention. It is noted that FIG. 2 shows only a part of the communication apparatus directly relevant to the present invention. Actually, for example, the communication apparatus may be configured by a personal computer or such, as described later with reference to FIG. 18. As shown in FIG. 2, the communication apparatus includes a network interface 3, a prefix information managing part 2, an address selecting part 1 and a prefix information list 4 (actually a storage device). These parts are operated by a CPU (not shown, for example, corresponding to a CPU 501 of FIG. 18), a communication program according to an embodiment the present invention is stored in a ROM (not shown), and it is deployed in a RAM (not shown), and thus, the communication apparatus operates. For example, a modem 508 of FIG. 18 may correspond to the network interface 3, the prefix information managing part 2 and the address selecting part 1 may be actually realized by the CPU 501, the prefix information list 4 may be stored in a memory 504 or a HDD 505, the above-mentioned RAM and ROM may correspond to the memory 504.

The network interface 3 is actually configured by a NIC, a driver therefor and so forth. The prefix information list 4 is a list in which prefix information included in a router advertisement is registered. The prefix information managing part 2 extracts the prefix information from the router advertisement, registers the same in the prefix information list 4, and manages the same.

FIG. 3 shows one example of the prefix information list 4. The prefix information list 4 includes, as shown, a 'prefix', 'prefix length', 'lifetime', 'router address' and 'router lifetime'. 'Prefix' corresponds to the prefix itself. 'Prefix length' corresponds to a prefix length. 'Lifetime' corresponds to a time during which use of the prefix is allowed. 'Router address' corresponds to an address of a router which issued the prefix information included in the router advertisement. 'Router lifetime' corresponds to a lifetime of a default router.

In the prefix information list 4, the router addresses are registered from a time at which the communication apparatus is started up, in an order of the actual receptions of the corresponding router advertisements. When the number of the registrations exceeds a predetermined value, prefix information received thereafter is discarded as a general rule. Further, whether or not the prefix information listed in the prefix information list 4 is still valid is managed based on the preferred lifetime included in the prefix information. When the lifetime of the prefix information is extended before the lifetime has elapsed, the prefix information managing part 2 updates the lifetime without changing the registration order itself.

Returning to FIG. 2, the address selecting part 1 selects a predetermined number of prefixes from the prefix information stored in the prefix information list 4, and generates IP addresses to be used for communication. This processing of the address selecting part 1 corresponds to an address selecting step. Actually, the address selecting part 1 selects the predetermined number of prefixes from the top of the list of the addresses (see FIG. 3) registered in the prefix information list 4 and managed by the prefix information managing part 2.

The above-mentioned predetermined number is a specific number which is a maximum value of the number of available addresses to be generated by stateless address autoconfiguration, and is determined from a size of an available memory resource the communication apparatus has or such. This maximum value may be any number not less than 1. Further, the number of sets of the prefix information (i.e., the number of prefixes) listed in the prefix information list 4 and managed by the prefix information managing part 2 has a maximum value. This maximum value may be any number equal to or larger than the above-mentioned maximum value of the available addresses to be generated by stateless address autoconfiguration.

When the number of the prefixes registered in the prefix information list 4 (i.e., stored in the prefix information list 4) exceeds a predetermined number, the prefix information managing part 2 selects, for example, the first three (i.e., the predetermined number) prefixes registered in the prefix information list 4 as those to be used for actual communication. When the number of the prefixes registered in the prefix information list 4 is equal to or less than the predetermined number, all the registered prefixes are selected to be used for actual communication.

Further, when the lifetime registered in the prefix information list 4 becomes invalid, the prefix information managing part 2 informs the address selecting part 1 that the address invalid occurs, and then, the address selecting part 1 again selects the prefix from the prefix information list 4 for setting the address(es) to be automatically used for actual communication.

By configuring so, it is possible to positively control, without requiring any extra operation from a user or a network manager, the number of the addresses generated by stateless address autoconfiguration to be used for actual communication, equal to or less than the predetermined number. Further, it is possible to control the number of sets of the prefix information managed in the communication apparatus equal to or less than the corresponding predetermined number.

As a result, even for an apparatus such as the above-mentioned incorporating apparatus which has a limited system resource (memory), the automatic address generating method with the use of IPv6 addresses (i.e., stateless address autoconfiguration) can be applied since it is possible to appropriately estimate, at a system design stage, the maximum value of the possible resource consumed amount.

It is noted that an advantage of thus generating a plurality of IP addresses for actual communication is described now. That is, it becomes possible to carry out control such as to allocate different IP addresses for respective functions of the communication apparatus, for respective users, or such.

Further, an advantage of thus limiting the number of sets of the prefix information used for generating a plurality of IP addresses in stateless address autoconfiguration is that, the IP address has a prefix part and a suffix part. For example, a plurality of different IP addresses may be obtained from the common prefix part and respective different suffix parts. In such a case, for the prefix information, a storage area only for one set is required for the plurality of different IP addresses. Thus, by limiting the number of prefix information usable to generate IP addresses, a required memory capacity can be effectively reduced.

Further, the prefix information managing part 2 may be configured in such a manner that, in addition to the prefix information, information indicating whether or not the router having provided the prefix information can be regarded as a default router. This information is included in the router advertisement as described in RFC2461. That is, from the value of the router lifetime (see FIG. 9) included in the router advertisement, whether or not the router having provided the prefix information can be regarded as a default router, can be determined. When the value of the router lifetime is not zero, this shows that the router can be regarded as a default router.

Further, a configuration may be provided in the embodiment of the present invention such that, when the prefix information received included in the router advertisement by the communication apparatus is from the router which can be usable as a default router, and also, has not yet been registered in the prefix information list 4, it is determined whether or not prefix information which has been already registered in the prefix information list 4 is from a router which cannot be used as a default router. In this case, when such prefix information has been already registered, this prefix information is deleted, and instead, the above-mentioned prefix information newly received is replaced therewith.

The router usable as a default router means a router which can communicate with outside of the network segment to which the router belongs. Accordingly, by the configuring mentioned above, it is possible to reduce a possibility that addresses are generated based on information from the router which cannot carry out packet routing. As a result, it is possible to prevent such a situation that, only addresses which cannot be applied to a communication with the outside are set, and access to the communication apparatus may not be possible.

Further, a configuration may be provided in the embodiment of the present invention such that the address selecting part 1 selects a prefix from the prefix information registered in the prefix information list 4, counts the number of times of actual communication operation with the outside with the use of the address generated with the use of the thus-selected prefix. In this case, the count result is used for 're-evaluation of already registered prefix information' described below with reference to FIG. 10, for example.

In this configuration, the address selecting part 1 has a function of determining how many times each address has been effectively used for actual communication, and, based on the determination, it can identify an address which, if any, has been erroneously generated based on false information or such. Then, also the prefix information, from which such a problematic address has been generated, may be notified of to the prefix information managing part 2, which then deletes the prefix information or lowers the selection priority therefor, by which, it is possible to carry out efficient operation with the use of the limited number of proper addresses.

Figure 4:
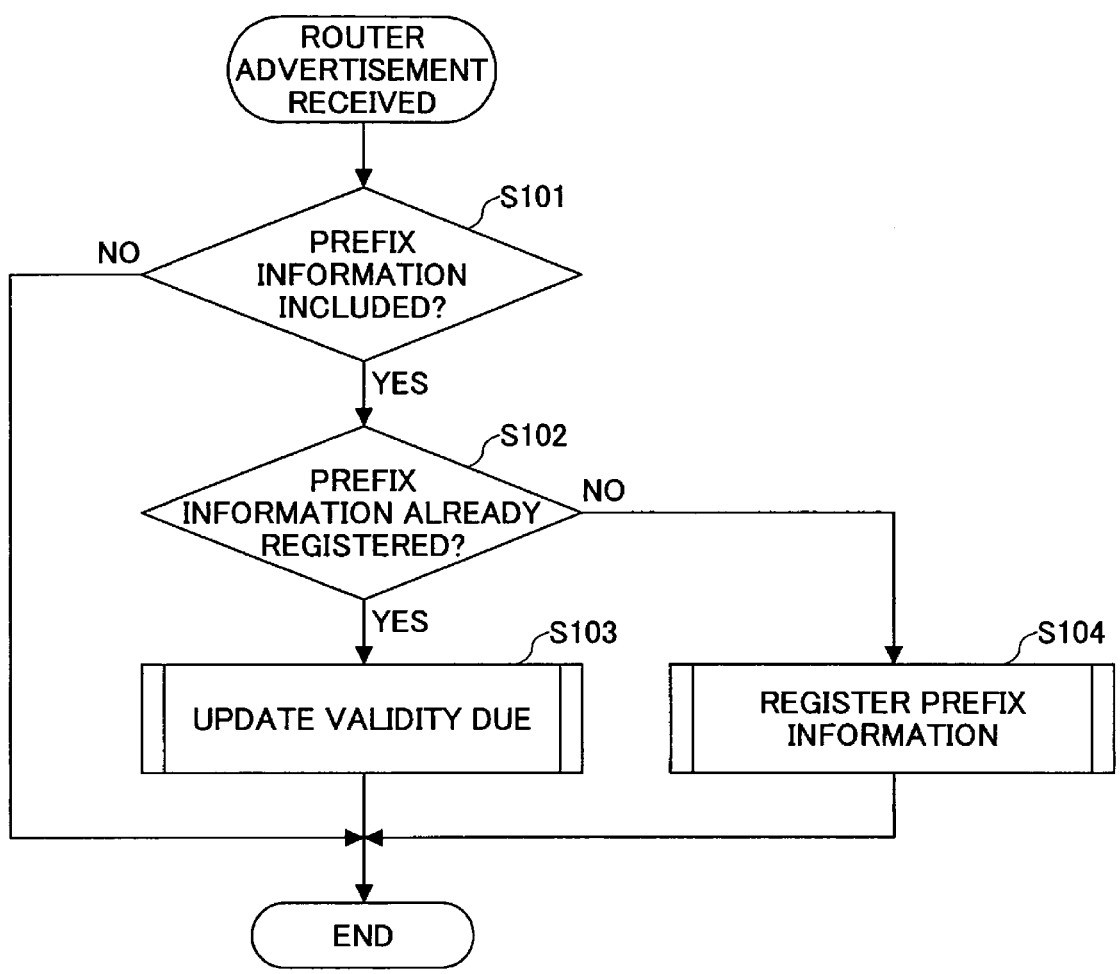
FIG. 4 and FIG. 5 show a flow chart of prefix information registering processing.

Next, with reference to FIGS. 4 through 10, the prefix information registering processing will be described. FIG. 4 shows a flow chart of processing carried out when the router advertisement has been received by the communication apparatus in the embodiment of the present invention. In Step S101, it is determined whether or not the router advertisement includes prefix information. When no prefix information is included (NO), the processing is ended.

When prefix information is included (YES), it is determined in Step S102 whether or not the prefix information has been already registered in the prefix information list 4 of the communication apparatus. When the prefix information has been already registered (YES), the lifetime of the prefix information is updated in the prefix information list 4 (see FIG. 3) in Step S103. When the prefix information has not been registered yet (NO), the prefix information is registered in the prefix information list 4 in Step S104, and the processing is ended. Step S104 corresponds to a prefix information managing step.

Figure 5:
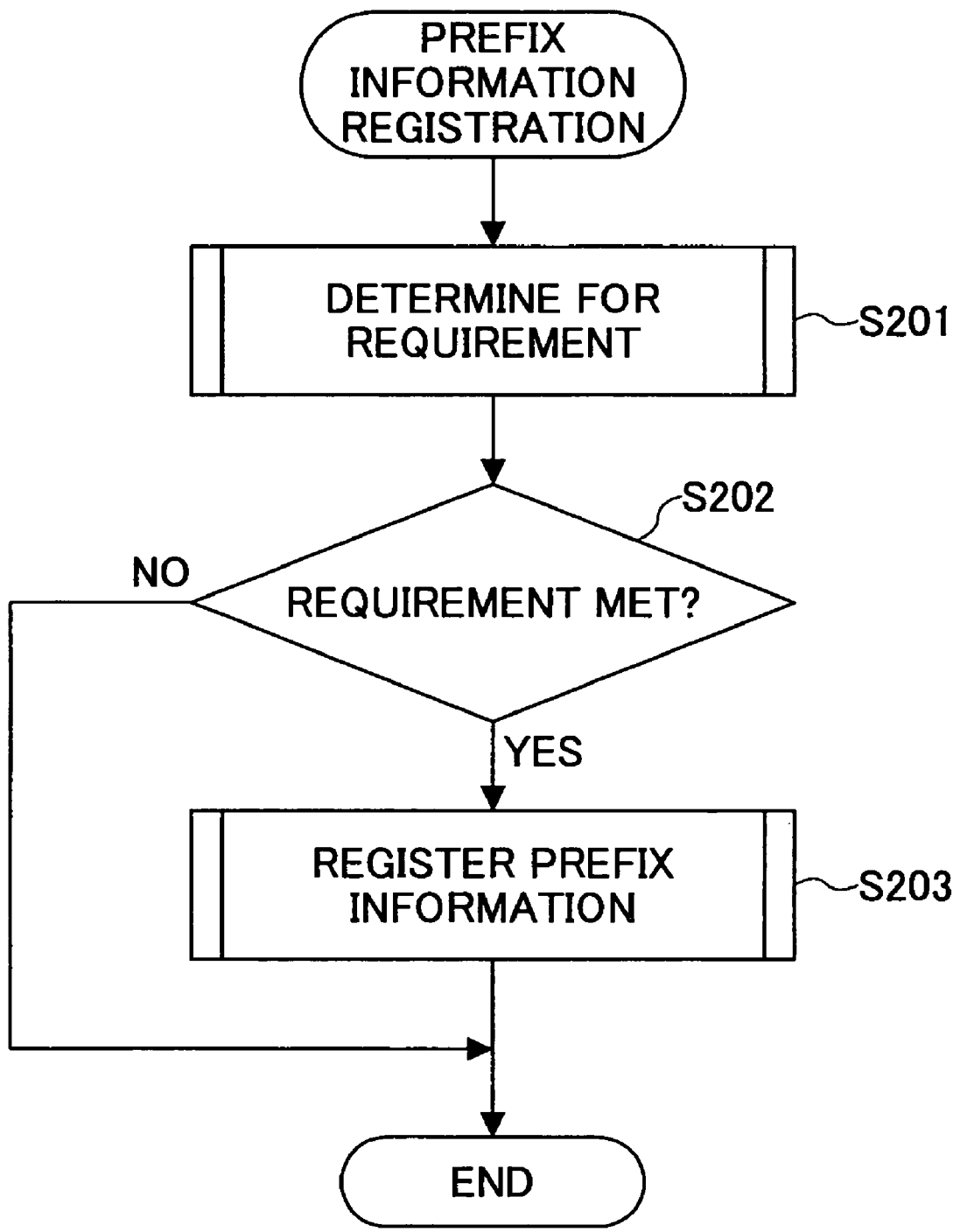

Next, prefix information registering processing of Step S104 will now be described with reference to FIG. 5. FIG. 5 shows a flow chart of the prefix information registering processing. In Step S201, requirement determination processing (described later) is carried out. When it is determined that a given requirement is met (YES in Step S202), the prefix information is actually registered in Step S203. When the requirement is not met (NO in Step S202), the processing is ended.

The requirement determination processing of Step S201 will now be described with reference to FIGS. 6 through 10. First through fourth, i.e., total four requirements will be described. In the embodiment of the present invention, any one or any combinations of these four requirements may be actually applied. The first requirement is whether or not the number of sets of prefix information already registered in the prefix information list 4 is less than a predetermined number. This predetermined number is referred to as Pmax. This case will be described with reference to FIG. 6.

Figure 6:
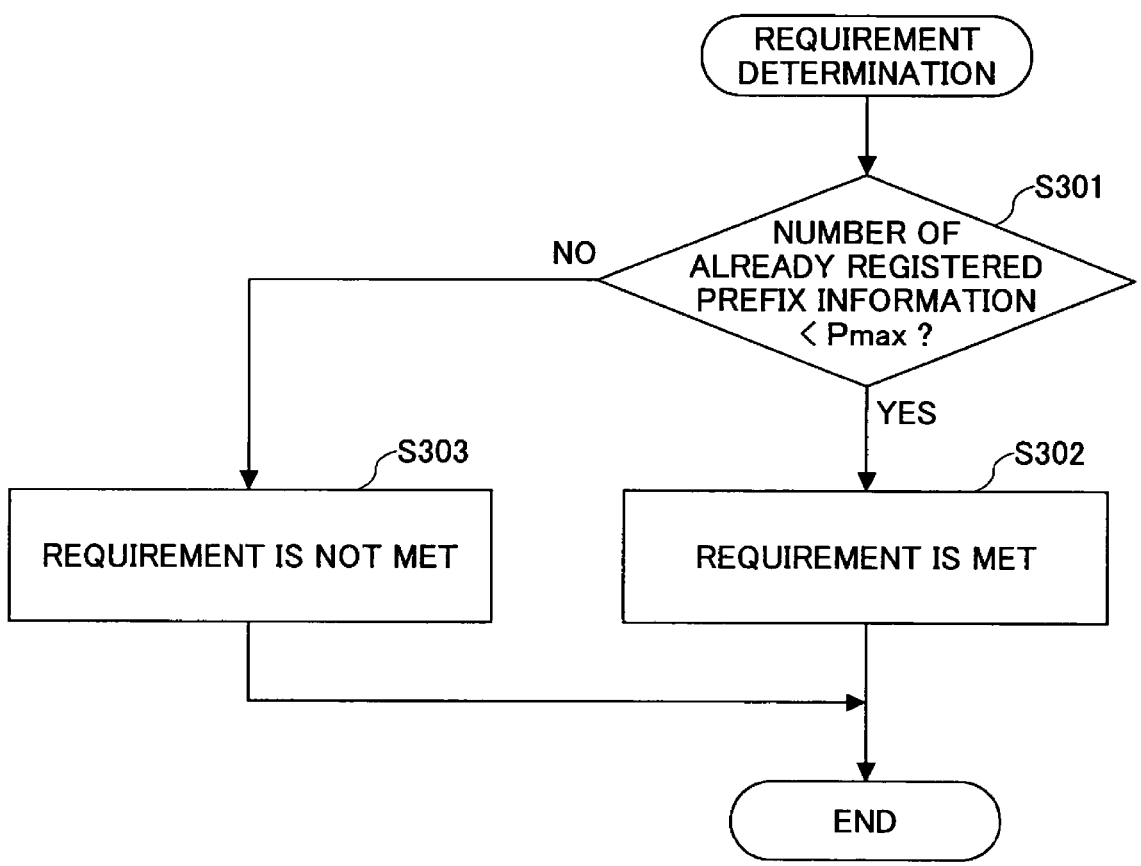
FIGS. 6 through 8 show flow charts of requirement determination processing.

In Step S301 of FIG. 6, it is determined whether or not the number of sets of prefix information already registered in the prefix information list 4 is less than Pmax. When the number is less than Pmax (YES), determination is made such that the requirement is met in Step S302, and the processing is ended. When the number is not less than Pmax (NO), determination is made such that the requirement is not met in Step S303, and the processing is ended.

The second requirement is whether or not the prefix information to register is one which has been already registered in the prefix information list 4. In other words, it is determined whether or not, even if the prefix information is registered, no duplication occurs. This case will now be described with reference to FIG. 7.

Figure 7:
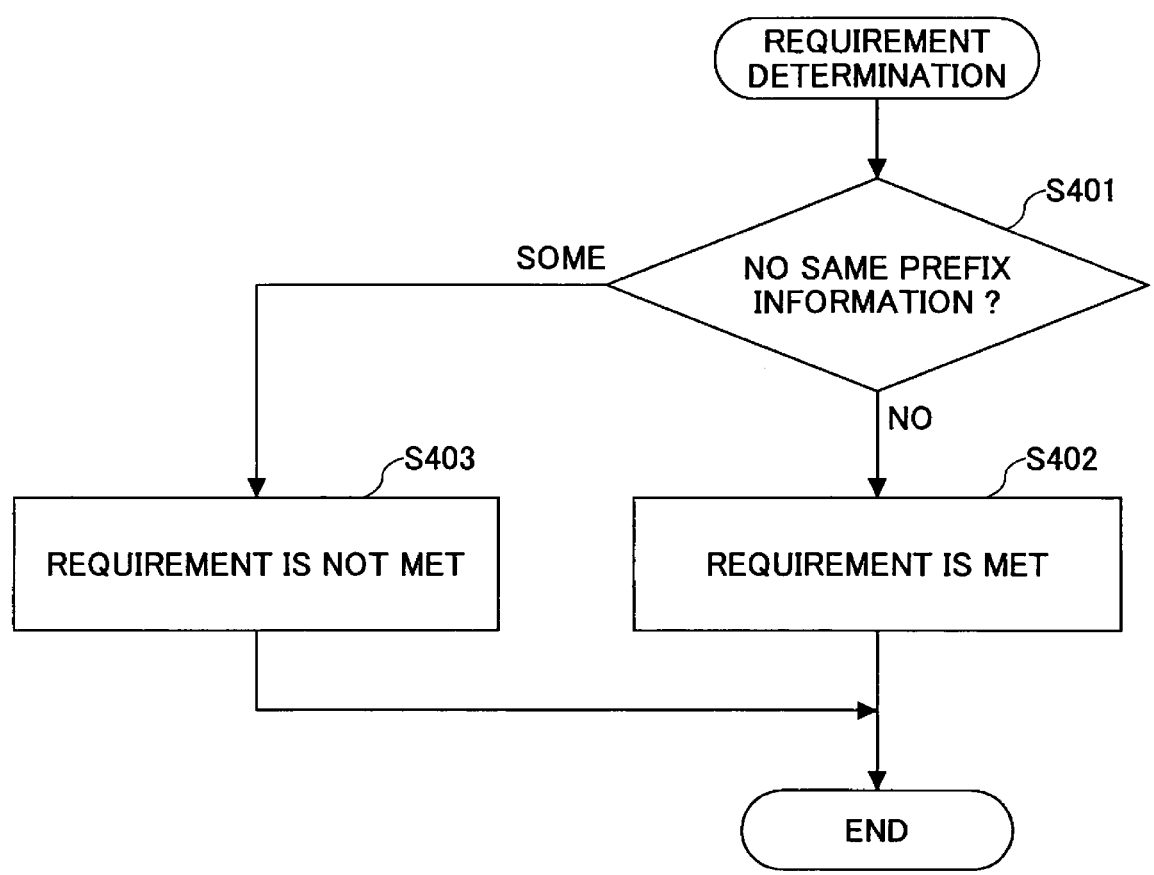

In Step S401 of FIG. 7, it is determined whether or not the prefix information to register is one which has not been already registered in the prefix information list 4. When no duplication occurs (NO of Step S401), determination is made such that the requirement is met in Step S402, and the processing is ended. When duplication occurs (SOME of Step S401), determination is made such that the requirement is not met in Step S403, and the processing is ended. For the determination (Step S401) for the duplication, a configuration may be made such that only when both are coincident completely, it is determined that duplication occurs. Alternatively, a configuration may be made such that, the number of digits included in the prefix information to compare is limited, and, it is determined that duplication occurs when coincident occurs within the limited number of digits. In this case, the above-mentioned prefix number may be further compared between both.

The third requirement is whether or not the corresponding router's lifetime is zero. The corresponding router means the router having issued the router advertisement, from which the prefix information, to register, has been extracted. This case will now be described with reference to FIG. 8. When the router's lifetime is zero, the router which has issued the router advertisement cannot act as a default router as mentioned above.

Figure 8:
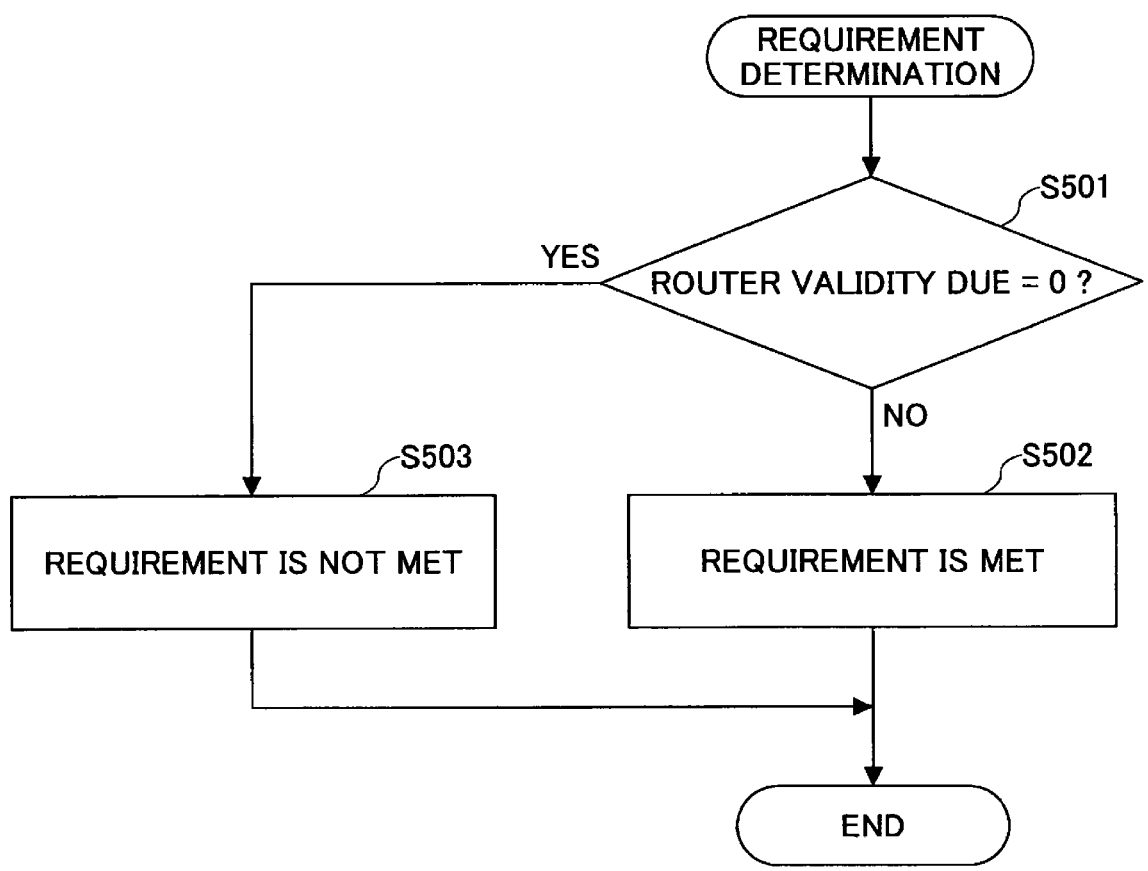

In Step S501 of FIG. 8, it is determined whether or not the router's lifetime is zero. When it is not zero (NO), determination is made such that the requirement is met in Step S502, and the processing is ended. When it is zero (YES), determination is made such that the requirement is not met in Step S503, and the processing is ended.

Figure 9:
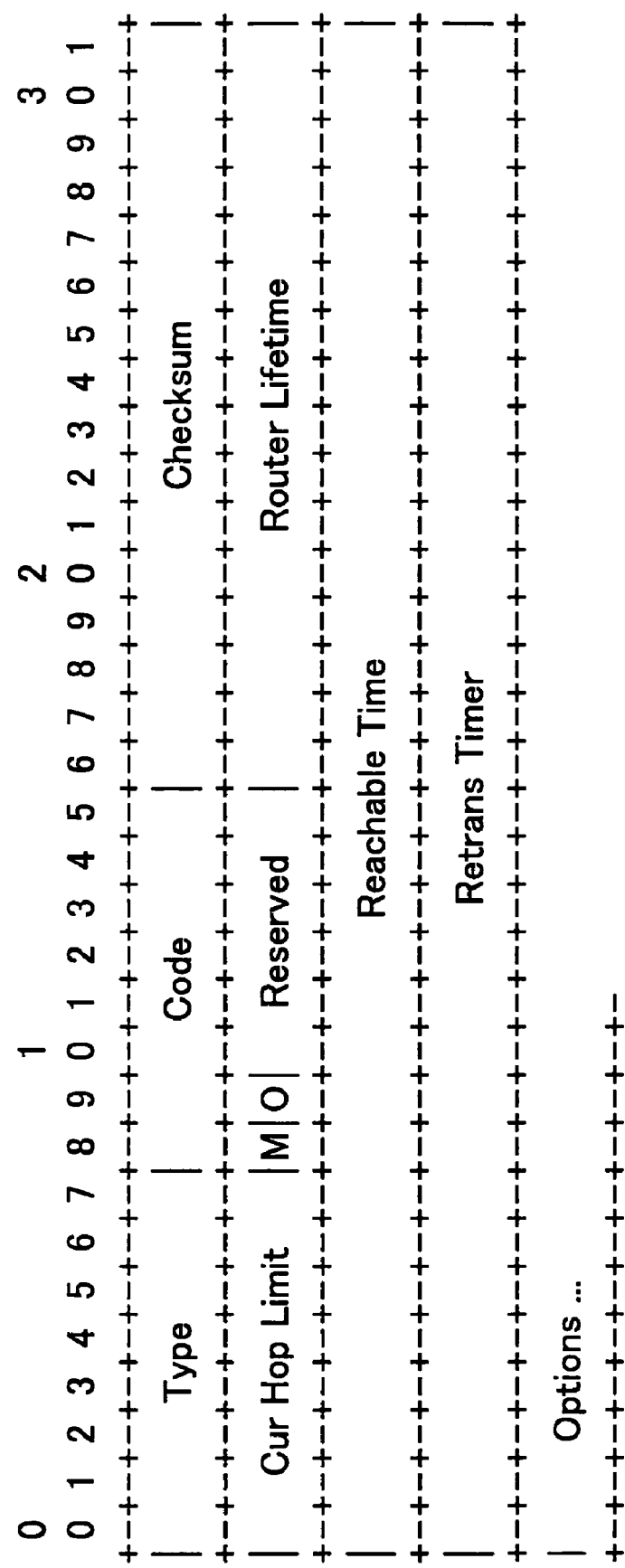
FIG. 9 shows the contents of one example of a router advertisement.

As mentioned above, the router's lifetime can be known from Router Lifetime included in the router advertisement as shown in FIG. 9.

The fourth requirement is whether or not there is any prefix information to be deleted from the prefix information list 4 when the number of sets of prefix information already registered there has reached an upper limit, the registered prefix information is re-evaluated. This case will now be described with reference to FIG. 10. In this case, the prefix information to be deleted is actually deleted, and instead, the newly obtained prefix information is registered as a replacement.

Figure 10:
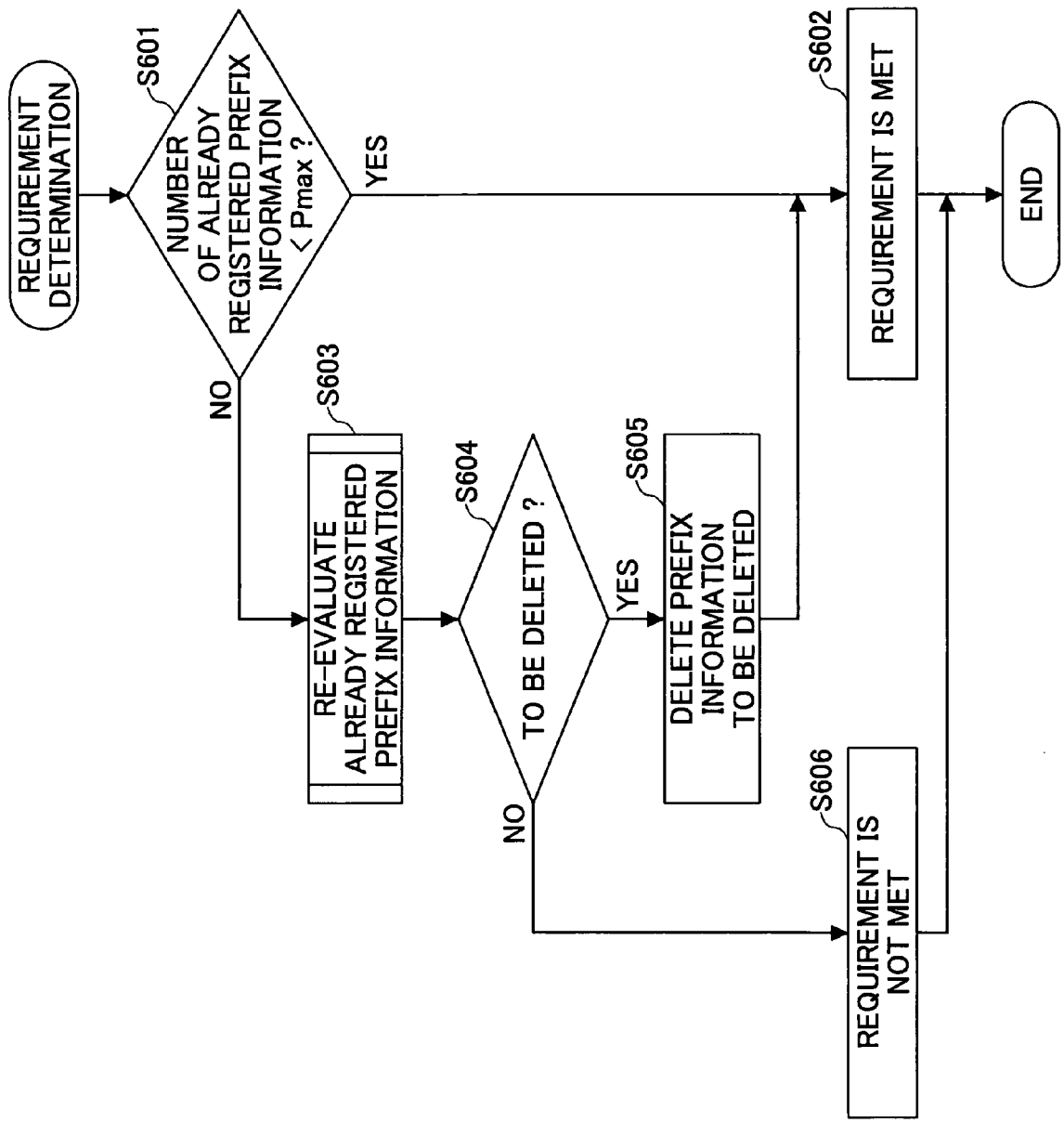
FIG. 10 shows a flow chart of requirement determination processing.

In Step S601 of FIG. 10, it is determined whether or not the number of sets of prefix information is smaller than Pmax (which may be the same as Pmax of FIG. 6). When it is smaller than Pmax (YES), determination is made such that the requirement is met in Step S602, and the processing is ended. When it is not less than Pmax, re-evaluation is made on the prefix information already registered in the prefix information list 4. Specifically, it is determined whether or not there is prefix information, for which, the number of times of actual communication for which the prefix information has been actually used as the IP address(es), is relatively small. Prefix information, for which, the number of times of actual communication for which the prefix information has been actually used as the IP address(es), is relatively small, is determined as to be deleted. When it is thus determined in Step S604, as a result of the re-evaluation, that there is prefix information to be deleted (YES), the prefix information is actually deleted in Step S605, determination is made such that the requirement is thus met (i.e., as a result of the deletion, the actual number of the registered sets of prefix information is reduced accordingly, and thus, the newly obtained prefix information can be registered as a replacement) in Step S602, and the processing is ended. When there is no prefix information to be deleted (NO), determination is made such that the requirement is not met in Step S606, and the processing is ended.

It is noted that, the above-mentioned 'prefix information, for which, the number of times of actual communication for which the prefix information has been actually used as the IP address(es), is relatively small', may be determined by the following manner, for example. That is, the number of times indicating how many times each prefix information has been used is counted for each communication occasion. Then, the thus-obtained numbers of communication times for the respective ones of prefix information are sorted to obtain the smallest number and thus obtain prefix information which has been least used, and the thus-obtained prefix information may be determined as the 'prefix information, for which, the number of times of actual communication for which the prefix information has been actually used as the IP address(es), is relatively small'. Further, in this case, only the prefix information having the number of communication times, not more than a half, a tenth, or such, of the number of the communication times of the prefix information which has been most used, may be determined as the 'prefix information, for which, the number of times of actual communication for which the prefix information has been actually used as the IP address(es), is relatively small'. This is because, there may be a case where, the prefix information which, if any, even has the smallest number of communication times in the past but is currently used frequently, should not be uniformly deleted.

Figure 11:
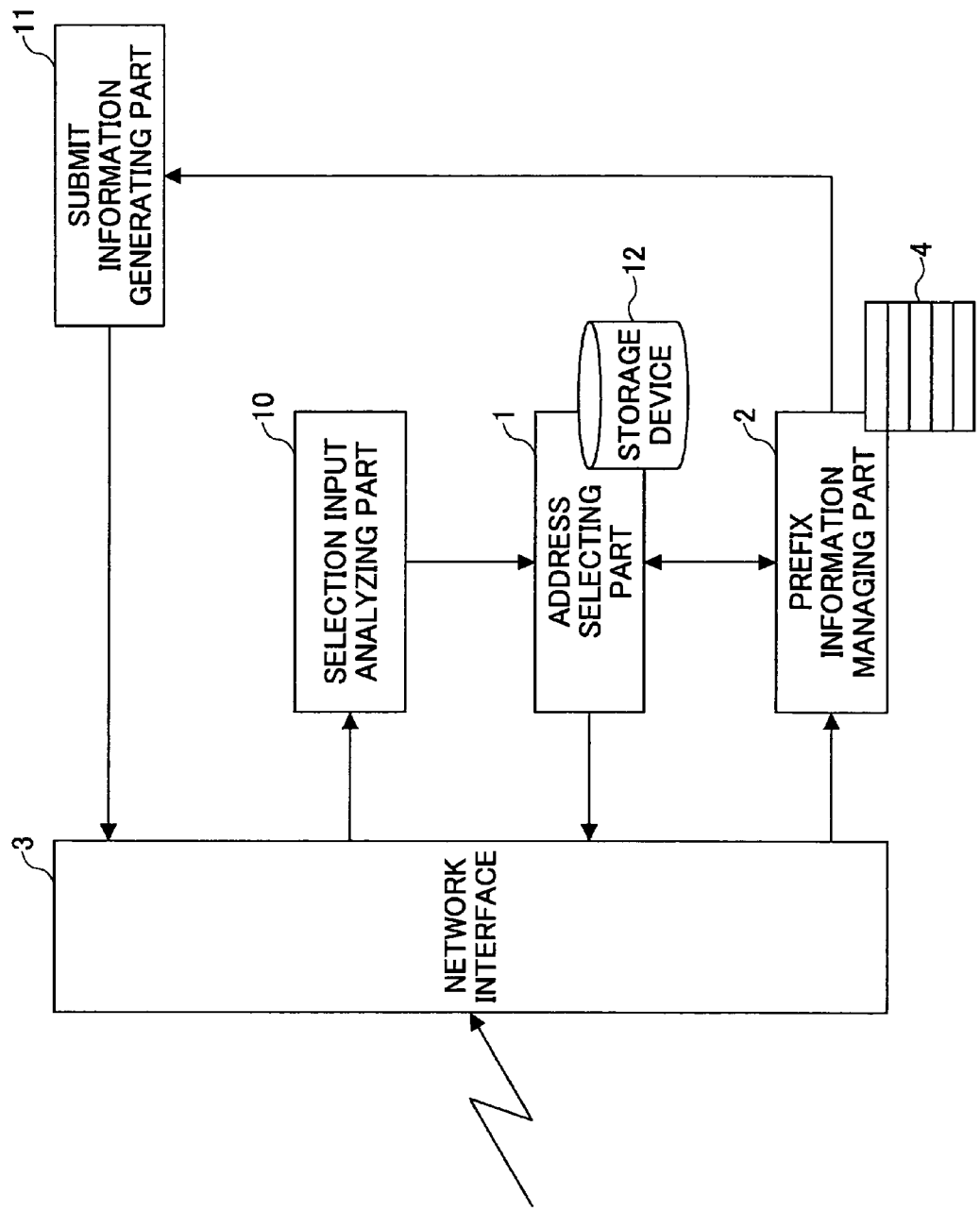
FIG. 11 shows a communication apparatus allowing user's input.

Next, a communication apparatus in a variant embodiment of the above-described embodiment of the present invention, in which address selection by a user is allowed, will now be described with reference to FIG. 11. In the configuration shown in FIG. 11, in addition to the configuration of the embodiment with reference to FIG. 1, a selection input analyzing part 10, a submit information generating part 11, and a storage device 12 of the address selecting part 1 are added. The submit information generating part 11 generates submit information for submitting the prefix information stored in the prefix information list 4, to a user. Then, after the user makes a selection therefrom and makes the corresponding input operation, the selection input analyzing part 10 analyzes the contents of the user's input operation indicating the selection result from among the prefix information submitted to the user as mentioned above, recognizes the prefix information thus selected by the user, and notifies the address selecting part 1 of the thus-selected prefix information. The storage device 12 is used for storing the prefix information thus selected by the user and notified of by the selection input analyzing part 10. The storage device 12 has a function to keep the contents of the prefix information, thus selected by the user, in a form of history. On the other hand, the contents stored in the prefix information list 4 and managed by the prefix information managing part 2 may be changed appropriately without necessarily being kept in a form of history.

Figure 12:
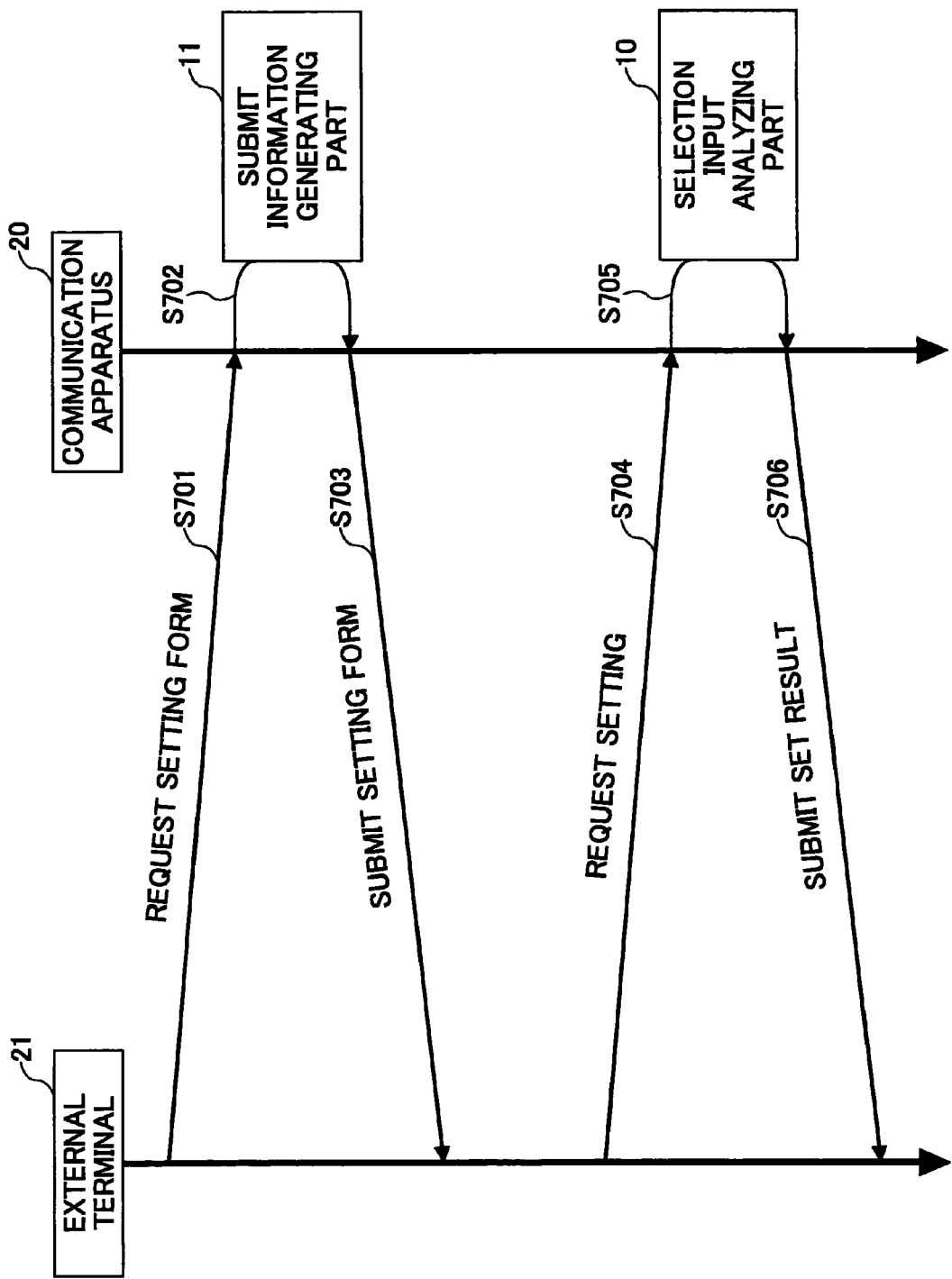
FIG. 12 shows a sequence diagram of transmission/reception between an external terminal and the communication apparatus.

By the configuration described above, the user can select the address(es) to be used for actual communication. FIG. 12 shows a sequence diagram of transmission/reception of information between an external terminal 21 and the communication apparatus 20 for when the user makes the selection/setting from the external terminal in this configuration. In FIG. 12, instead of the external terminal 21, an input/output unit may be applied when the communication apparatus 20 is provided with the input/output unit from which the user can select the desired address(es) from among those displayed to the user thereby.

In Step S701 of FIG. 12, the external terminal 21 requests the communication apparatus 20 for a setting form. Then, in Step S702, the communication apparatus 20 generates the setting form by means of the submit information generating part 11, and, in Step S703, the communication apparatus 20 transmits the thus-generated setting form to the external apparatus 21. The setting form thus generated there means a form of HTML or such for displaying the addresses generated form the prefix information registered in the prefix information list 4 of the communication apparatus 20 to be displayed on the external terminal 21.

Then the user selects and inputs the selection result from among the thus-displayed addresses on the external terminal 21. The selection result is then notified of to the communication apparatus 20 by the external terminal 21 as a setting request in Step S704. In Step S705, the selection input analyzing part 10 of the communication apparatus 20 then analyzes the thus-transmitted contents of the setting request, recognizes the prefix information thus selected by the user. The selection input analyzing part 10 then notifies the address selecting part 1 of the selected prefix information. The selection input analyzing part 10 then notifies the external terminal 21 that the setting has been made based on the selected prefix information, in Step S706. The external terminal submits this setting result to the user on its display unit.

Step S702 corresponds to a submit information generating step and Step S705 corresponds to a selection input analyzing step.

Figure 13:
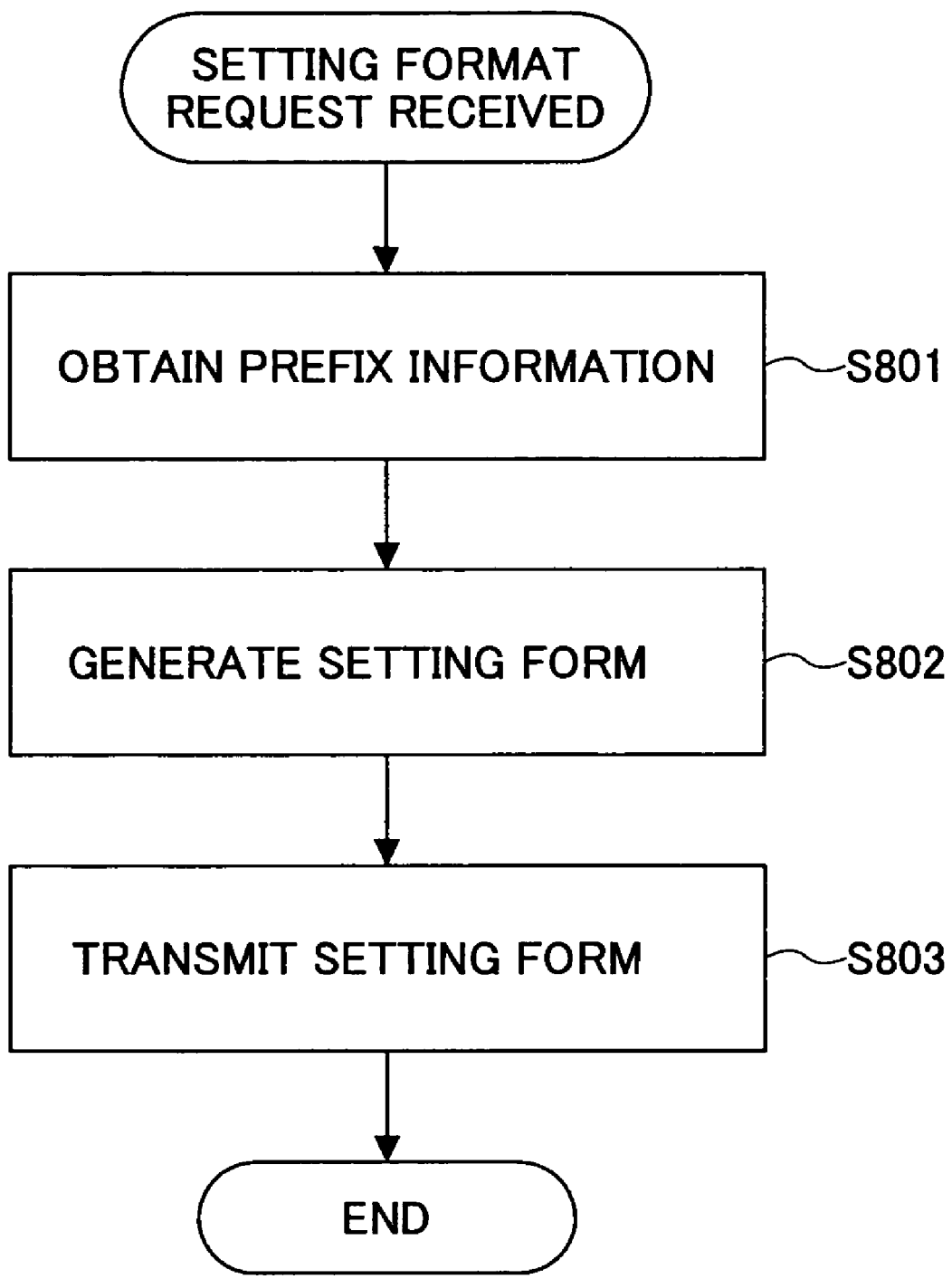
FIG. 13 shows a flow chart of operation of a submit information generating part.

FIG. 13 shows a flow chart of processing of the submit information generating part 11 in the sequence shown in FIG. 12. In Step S801, the prefix information is obtained from the prefix information list 4 of the communication apparatus 20. In Step S802, the setting form is generated as mentioned above. Then, in Step S803, the thus-generated stetting form is transmitted to the external terminal 21.

Figure 14:
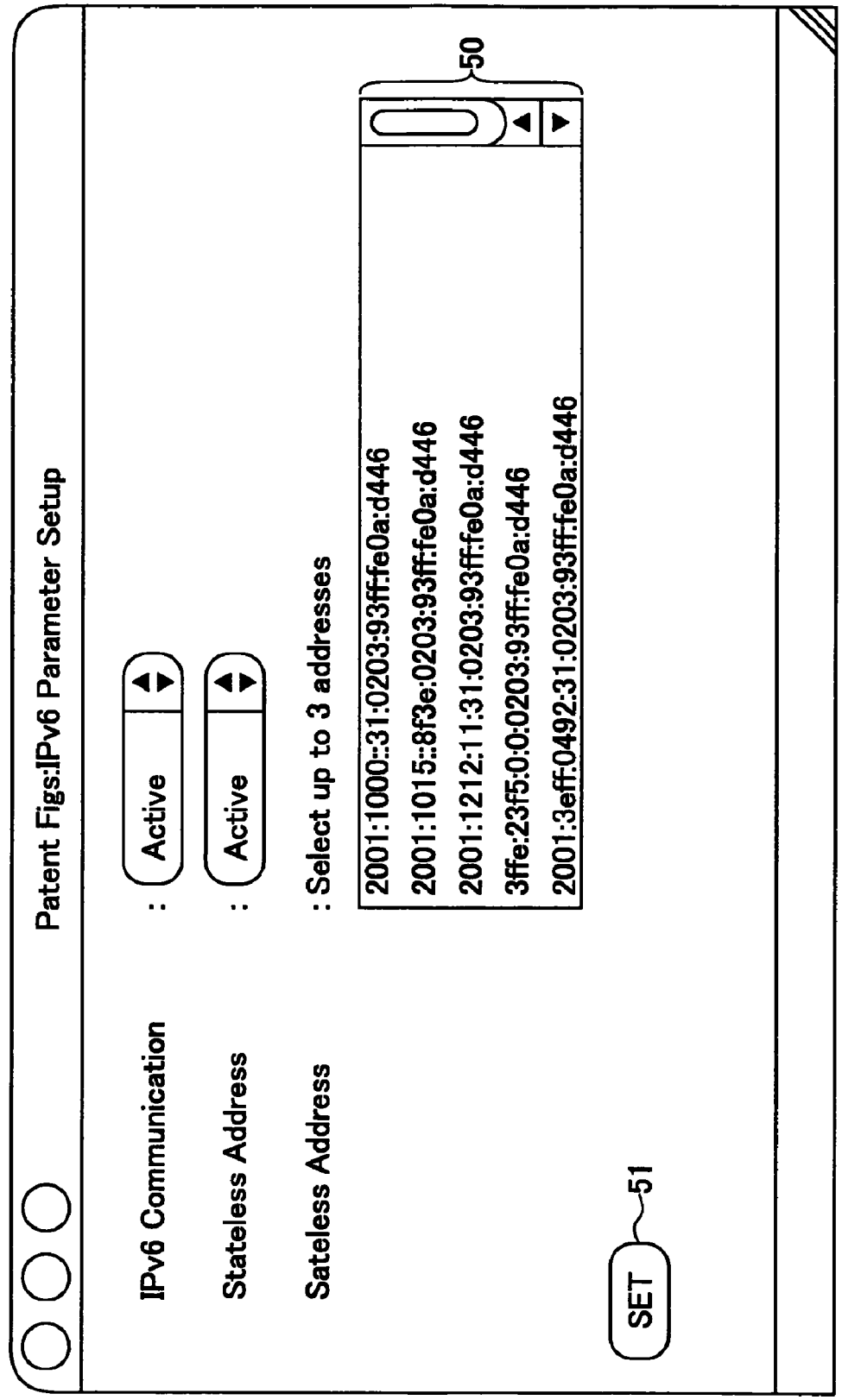
FIGS. 14 and 15 show pages displayed to a user.
Figure 15:
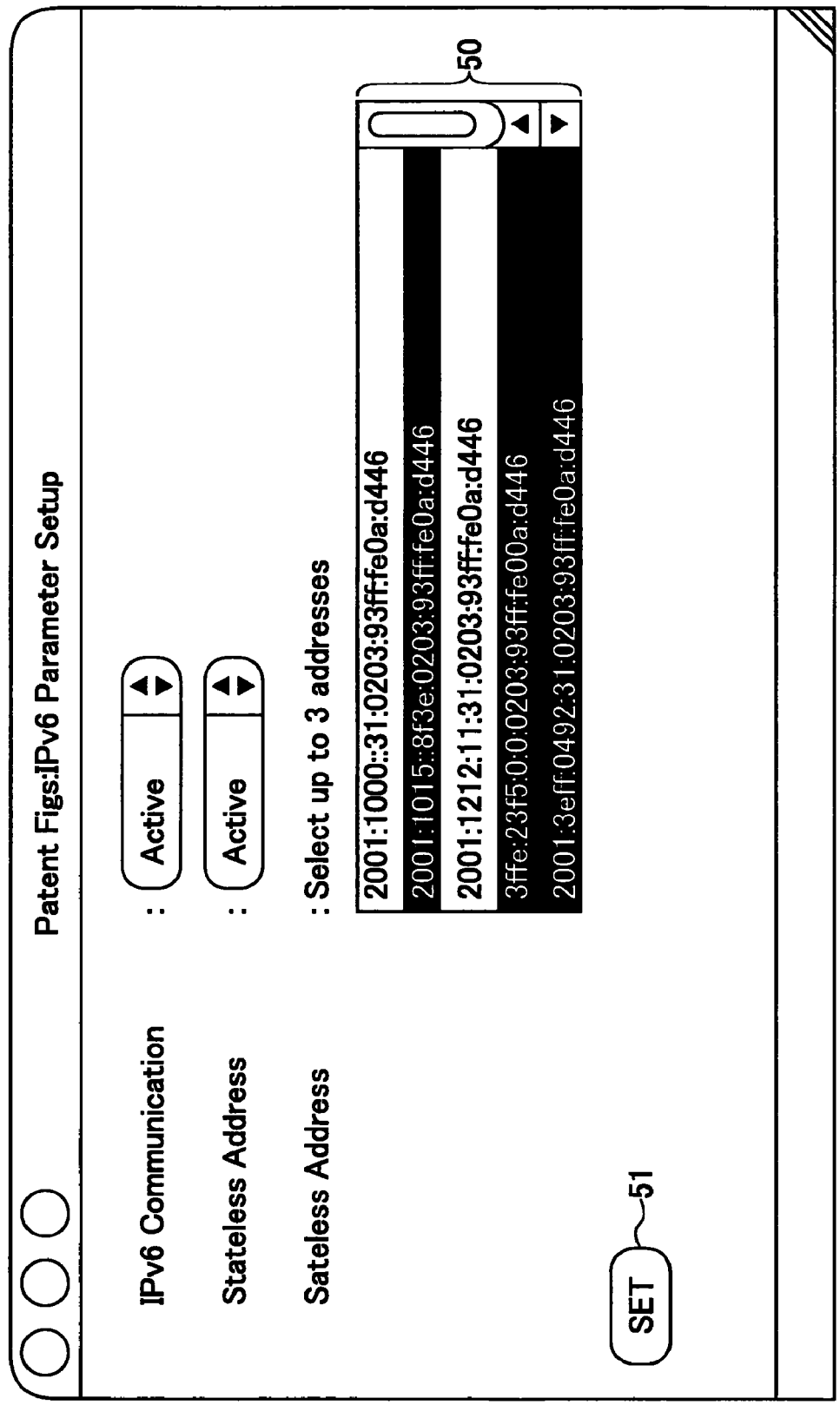

FIGS. 14 and 15 show example of pages actually displayed on the display unit of the external terminal 21 in this case. FIG. 14 shows a page showing the above-mentioned setting form submitted to the user. As shown, in this page, an address list 50 and a setting button 51 are displayed. The addresses thus displayed in the address list 50 are those generated from the prefix information registered in the prefix information list 4 of the communication apparatus 20.

In this case, the use can select, for example, three addresses from those thus displayed in the page on the display unit of the external terminal 21. When the three addresses are thus selected by the user, as shown in FIG. 15, the thus-selected addresses are inverted in the display. When the user presses the setting button 51 in this state, the thus-selected information is transmitted to the communication apparatus 20 from the external terminal 21, and then, is notified of to the address selecting part 1 of the communication apparatus 20 as mentioned above.

Figure 16:
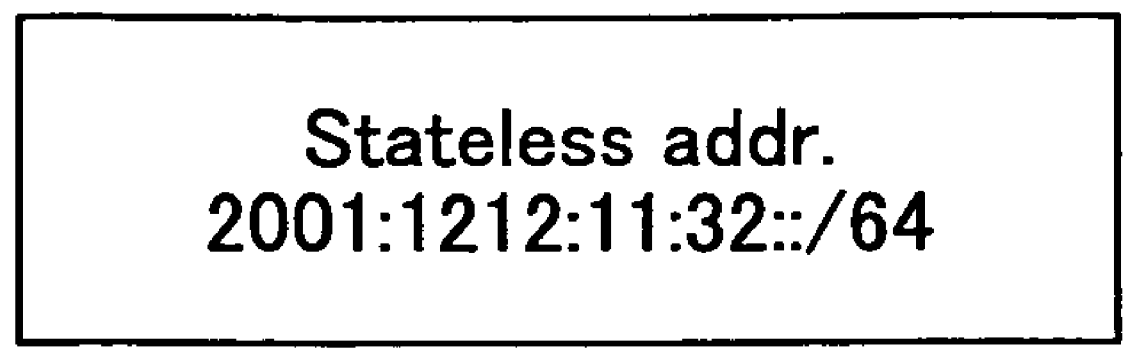

In the example of FIGS. 14 and 15, the list of the addresses generated from the registered prefix information is displayed by means of a Web browser. However, instead, a configuration may be made such that only the prefix information registered in the prefix information list 4 of the communication apparatus 20 is directly displayed on the display unit of the external terminal 21. Also in this configuration, the sufficient function can be provided. Especially, when such a list is displayed on the display unit directly attached to the communication apparatus body itself, the number of characters which are allowed to be displayed there may be limited. In such a case, a configuration may be made such that, as shown in FIG. 16, only the prefix information is directly displayed so that it is possible to effectively reduce the number of characters required to submit the prefix information candidate(s). Accordingly, in this way, the configuration may be provided such that only the prefix information is displayed as the candidate(s) when the size of the display unit is relatively small. On the other hand, when such an environment is provided that a flexibility of displaying information is available, that is, an environment in which the Web browser or such is available, the configuration may be provided such that the addresses generated from the prefix information are displayed as the candidates described above with reference to FIGS. 14 and 15.

The user interface of the embodiment is as described above. Next, details of processing carried out inside the communication apparatus 20 will be described. The selection input analyzing part 10 analyzes the information set in the setting form and transmitted to the communication apparatus 20 from the external terminal 21, or it analyzes the selected information which is input from the input/output unit when the communication apparatus body itself has the input/output unit attached thereto.

That is, when the user selects the address(es) to use, from among the submit addresses or the prefix information candidate(s), and inputs the same, the selected and input contents are transferred to the selection input analyzing part 10.

The selection input analyzing part 10 analyzes as to which of the prefix information has been actually selected by the user, and notifies the address selecting part 1 of the analysis result.

The address selecting part 1 is configured so as to select, by priority, the prefix information thus selected by the user. For example, when the communication apparatus 20 holds total five sets of prefix information in its prefix information list 4, and the prefix information selected by the user is included therein, the address selecting part 1 first selects the prefix information selected by the user.

When the number of sets of prefix information are selected by the user, but this number is less than a predetermined number, the address selecting part 1 further selects, for making up for the shortfall, the prefix information first received included in the router advertisement and thus registered in the prefix information list 4, in addition to the prefix information thus selected by the user. When the prefix information selected by the user becomes invalid, the address generated based on the prefix information becomes invalid accordingly. Also in such a case, the prefix information selected information is still held in the storage device 12 of the address selecting part 1. Further, in such a case, the user is submitted that the IP address which has been used has become thus not usable.

Further, a configuration may be provided in the embodiment of the present invention such that, prefix information which has not been selected by the user is selected and a new address is set therefrom. By this configuration, communication can be made with the use of the thus-newly-set address even in a situation in which, the communication apparatus is a portable apparatus for example, and the communication apparatus is moved so that it becomes not possible to obtain any prefix information set by the user.

On the other hand, a configuration may be provided in the embodiment of the present invention such that, even when the address become invalid, selection of new prefix information for the purpose of setting the substitute address is prevented. This configuration is advantageous in that, in the communication apparatus which is installed in a fixed manner, in a case where the valid lifetime cannot be updated properly due to a reason such as a temporary trouble in the router or such, adding of any new address is thus prevented. As a result, use of the address based on the prefix information selected by the user can be immediately started once the router is restored.

Further, the storage device 12 provided to the address selecting part 1 may be made of a nonvolatile storage device such as a flash memory, a NVRAM, a hard disk drive or such, in which the prefix information selected by the user is held. As a result, even when the power supply to the communication apparatus is once turned off, the selected contents are still held, and thus, after the power supply is restored, operation with the address intended by the user can be started without requiring the user's extra operation to again make the same selection.

Figure 17:
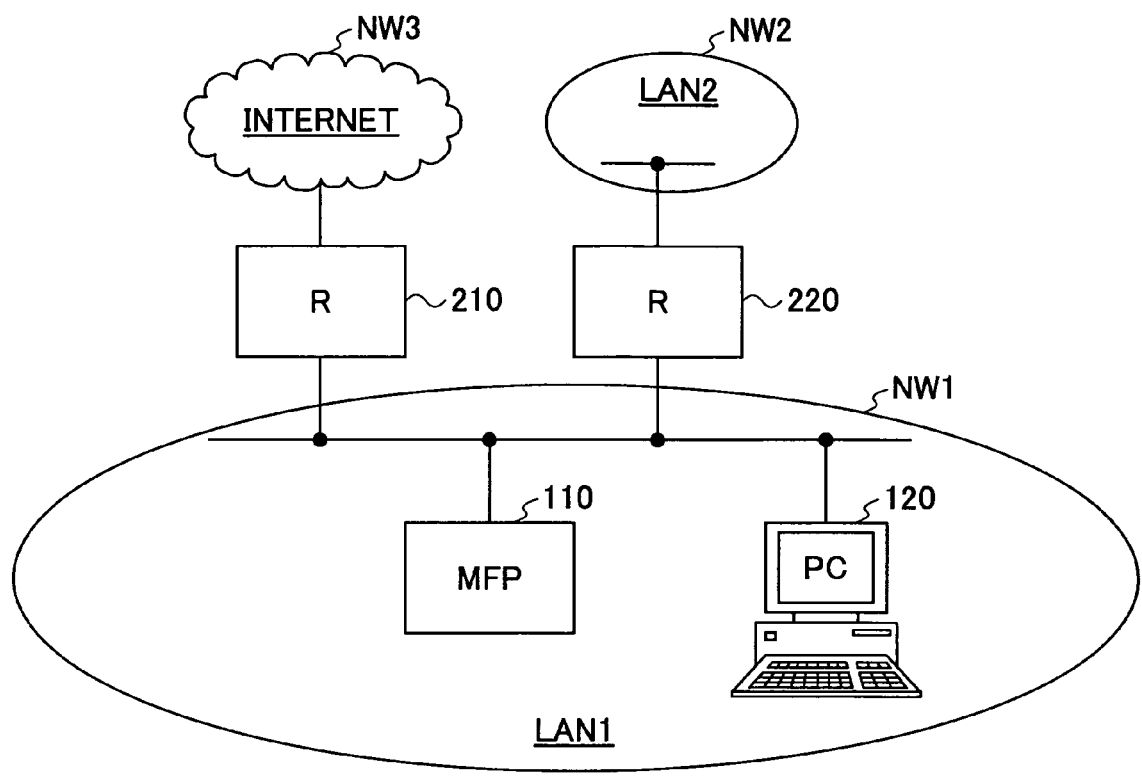
FIG. 17 shows an example in which the communication apparatus in the embodiment of the present invention is applied in a network environment.

FIG. 17 shows one example of a state in which an MFP or a personal computer, as any one of the communication apparatuses in the above-described embodiments of the present invention, is provided under a communication network environment.

As shown, the MFP 110 or the personal computer 120 as the communication apparatus in the embodiment of the present invention is connected to a network NW1 which is a LAN, which network is further connected to another network NW2 which is another LAN via a router 220, and also, the network NW1 is connected to the Internet NW3 via a router 210.

Each of the communication apparatuses, i.e., the MFP 110 and the personal computer 120, has an automatic address setting function of stateless address autoconfiguration, thereby it automatically produces IP addresses, and therewith, it can freely communicate with a host or such, which is connected to the communication apparatus via the network NW1, NW2 or NW3. At this occasion, as mentioned above, based on the prefix information, provided as included in the router advertisement issued by each router 210, 220 or such, the IP addresses are automatically produced and used for the communication.

Figure 18:
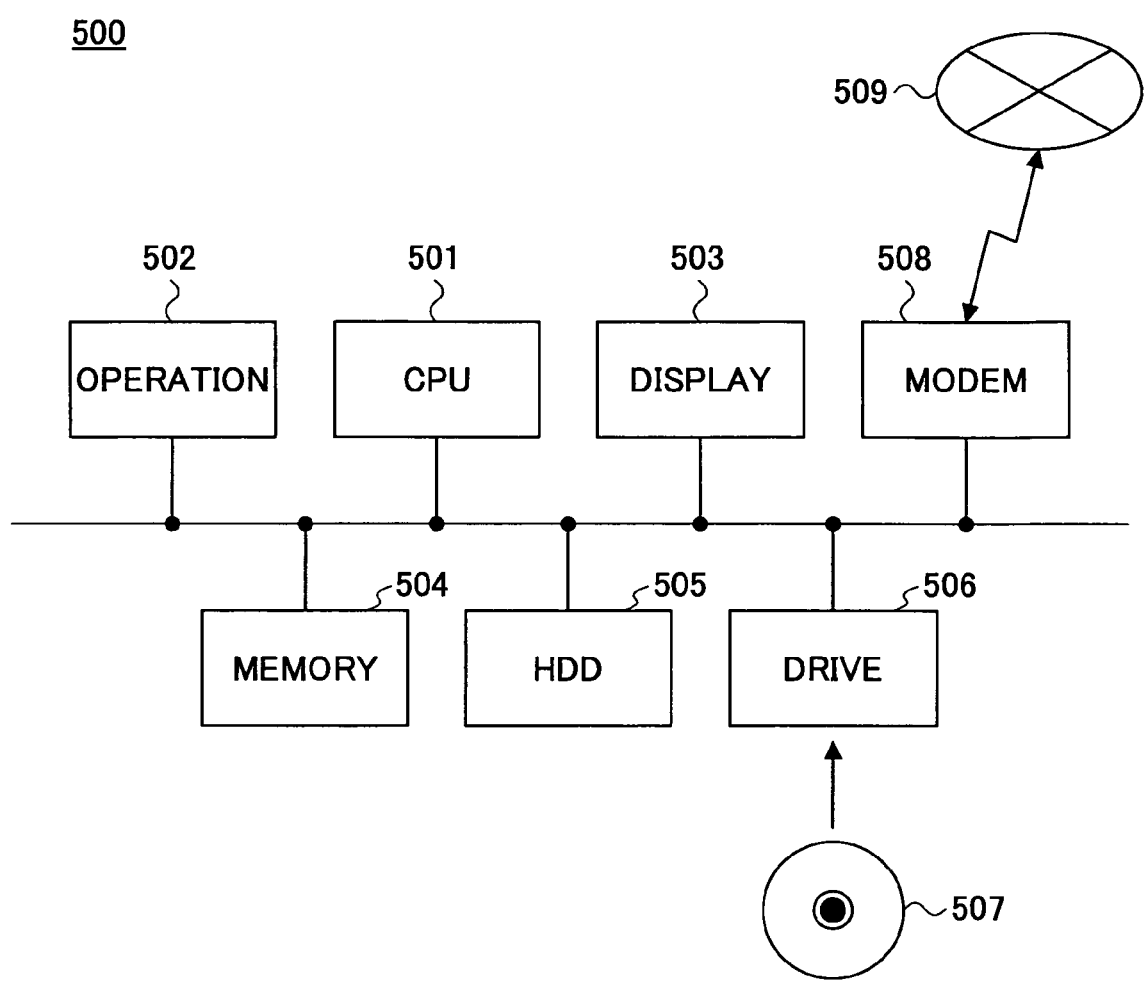
FIG. 18 illustrates a case where a communication method in one embodiment of the present invention is carried out by means of a computer.

FIG. 18 illustrates a case where a communication method carried out by the communication apparatus in the embodiment of the present invention described above with reference to FIGS. 1 through 17, is actually carried out by a computer automatically, as mentioned above.

As shown in FIG. 18, the computer 500 includes a CPU 501 for carrying out various operations by executing instructions included in a given program; an operation part 502 such as a keyboard, a mouse, and so forth, for a user to input operation contents or data; a display part 503 such as a CRT, a liquid crystal display device or such, for displaying, to the user, a processing progress, a processing result or such of the CPU 501; a memory 504 such as a ROM, a RAM and so forth, for storing the program to be executed by the CPU 501, or to be used as a work area of the CPU 501; a hard disk drive 505 for storing the program, data and so forth; a CD-ROM drive 506 for loading the program or data from the outside with the use of a CD-ROM 507 as an information recording medium; and a modem 508 for downloading the program or such, from an external server via a communication network 509 such as the Internet, LAN or such.

The computer 500 loads or downloads the program having the instructions for causing the CPU 501 to execute the communication method described above with reference to FIGS. 1 through 17, with the use of the CD-ROM 507 as the information recording media or the communication network 509. The program is then installed in the hard disk drive 505, is loaded on the memory 504, and is executed by the CPU 501. As a result, the computer 500 carries out the above-mentioned communication method in the embodiment of the present invention.

In this case, the computer 500 acts as the communication apparatus in the embodiment of the present invention.

Further, the present invention is not limited to the above-described embodiments, and variations and modifications may be made without departing from the basic concept of the present invention claimed below.

The present application is based on Japanese Priority Applications Nos. 2005-243421 and 2006-218427, field on Aug. 24, 2005 and Aug. 10, 2006, respectively, the entire contents of which are hereby incorporated herein by reference.

What is claimed is:

1. A communication apparatus carrying out communication with the use of an IP address, comprising:
a prefix information storage device in which prefix information included in a router advertisement is registered;
a prefix information managing part extracting the prefix information from the router advertisement, registering the prefix information in the prefix information storage device and managing the prefix information; and
an address selecting part selecting a number of prefixes from the prefix information registered in the prefix information storage device, and generating the IP address, the address selecting part configured to select the prefix information in an order in which the prefix information was registered in the prefix information storage device, wherein
the prefix information managing part determines the prefix information, for which the number of times it has been applied in communication is smaller than a fraction of a number of times a most used prefix information has been applied in communication, from among the prefix information selected by the address selecting part, and deletes the determined prefix information.

2. The communication apparatus as claimed in claim 1, wherein:
the prefix information registered in the prefix information storage device comprises prefix information meeting a requirement.

3. The communication apparatus as claimed in claim 2, wherein:
the prefix information meeting the requirement comprises prefix information not yet registered in the prefix information storage device.

4. The communication apparatus as claimed in claim 2, wherein:
the prefix information meeting the requirement comprises prefix information included in the router advertisement issued by a default router.

5. The communication apparatus as claimed in claim 2, wherein:

the requirement is applied when the number of sets of prefix information registered in the prefix information storage device has reached a number.

6. The communication apparatus as claimed in claim 1, further comprising:
    a submit information generating part generating submit information for submitting to a user the prefix information stored in the prefix information storage device; and
    a selection input analyzing part analyzing the contents selected and input by the user from among the submitted prefix information, recognizing the prefix information thus selected by the user, and notifying the address selecting part of the thus-selected prefix information.

7. The communication apparatus as claimed in claim 6, wherein:
    the prefix information selected by the user is stored in a nonvolatile storage device.

8. The communication apparatus as claimed in claim 6, wherein:
    the submit information generated by the submit information generating part comprises an address generated by stateless address autoconfiguration.

9. The communication apparatus as claimed in claim 6, wherein:
    the address selecting part newly selects the prefix information when a validity due of the IP address generated from the selected prefix information has expired.

10. The communication apparatus as claimed in claim 6, wherein:
    the submit information generating part submits to the user that the currently used IP address has become not usable, when a validity due of the IP address generated from the selected prefix information has expired.

11. The communication apparatus as claimed in claim 6, wherein:
    the address selecting part selects the IP address when the IP address has become usable again.

12. A communication method for carrying out communication with the use of an IP address, comprising:
    a prefix information managing step of extracting the prefix information from a router advertisement, registering the prefix information and managing the registered prefix information; and
    an address selecting step of selecting a number of prefixes from the prefix information registered in a prefix information storing part, selecting the prefix information in an order in which the prefix information was registered when the user selects a set of prefix information less than a number, and generating the IP address, wherein
    in the prefix information managing step, prefix information is determined, for which the number of times it has been applied in communication is, smaller than a fraction of a number of times a most used prefix information has been applied in communication, from among the prefix information selected in the address selecting step, and the thus-determined prefix information is deleted.

13. The communication method as claimed in claim 12, wherein:
    the prefix information to be registered comprises prefix information meeting a requirement; and
    the prefix information meeting the requirement comprises prefix information included in the router advertisement issued by a default router.

14. The communication method as claimed in claim 12, further comprising:
    a submit information generating step of generating submit information for submitting to the user the prefix information registered in the prefix information managing step; and
    a selection input analyzing step of analyzing the contents selected and input by the user from among the thus-submitted prefix information, recognizing the prefix information thus selected by the user, and providing to the address selecting step the thus-selected prefix information.

15. The communication method as claimed in claim 14, wherein:
    in the address selecting step, the prefix information is newly selected when a validity due of the IP address generated from the selected prefix information has expired.

16. The communication method as claimed in claim 12, wherein:
    in the address selecting step, the IP address is selected when the IP address has become usable again.

17. A non-transitory computer readable medium, when run on a computer, configured to instruct the computer to execute the method of claim 12.

\* \* \* \* \*